US011509650B2

(12) United States Patent
Beale et al.

(10) Patent No.: US 11,509,650 B2
(45) Date of Patent: Nov. 22, 2022

(54) ONE-TIME PASSWORD FOR SECURE SHARE MAPPING

(71) Applicant: Unisys Corporation, Blue Bell, PA (US)

(72) Inventors: Andrew Ward Beale, Mission Viejo, CA (US); Anthony P. Matyok, Springfield, PA (US); Clark C. Kogen, Chadds Ford, PA (US); David Strong, Wheatridge, CO (US)

(73) Assignee: Unisys Corporation, Blue Bell, PA (US)

( * ) Notice: Subject to any disclaimer, the term of this patent is extended or adjusted under 35 U.S.C. 154(b) by 358 days.

(21) Appl. No.: 16/782,875

(22) Filed: Feb. 5, 2020

(65) Prior Publication Data

US 2021/0243180 A1    Aug. 5, 2021

(51) Int. Cl.
*H04L 9/40*    (2022.01)
*H04L 47/70*    (2022.01)
*G06F 9/455*    (2018.01)
*H04L 9/32*    (2006.01)

(52) U.S. Cl.
CPC ........ *H04L 63/0838* (2013.01); *G06F 9/4552* (2013.01); *H04L 9/3236* (2013.01); *H04L 47/82* (2013.01); *H04L 63/102* (2013.01)

(58) Field of Classification Search
CPC ............... G06F 9/4552; G06F 9/45554; G06F 9/45558; G06F 2009/45579; G06F 2009/45587; G06F 21/46; H04L 9/3228; H04L 9/3236; H04L 63/0838; H04L 63/10; H04L 63/102
See application file for complete search history.

(56) References Cited

U.S. PATENT DOCUMENTS

| | | | | |
|---|---|---|---|---|
| 9,104,514 B2* | 8/2015 | Bravery | | G06F 8/60 |
| 10,079,832 B1* | 9/2018 | Dearment | | H04L 63/0823 |
| 10,447,682 B1* | 10/2019 | Du Lac | | H04L 9/3247 |
| 11,044,257 B1* | 6/2021 | Heuts | | H04L 63/108 |
| 2012/0072723 A1* | 3/2012 | Orsini | | G06F 21/6218 |
| | | | | 713/165 |
| 2014/0173597 A1* | 6/2014 | Anand | | G06F 9/5077 |
| | | | | 718/1 |
| 2016/0048411 A1* | 2/2016 | Chandrasekhar | | G06F 9/5077 |
| | | | | 718/1 |
| 2018/0285166 A1* | 10/2018 | Roy | | G06F 9/5016 |
| 2019/0095254 A1* | 3/2019 | Rao | | G06F 8/71 |
| 2019/0199687 A1* | 6/2019 | Lan | | H04L 63/10 |
| 2019/0251278 A1* | 8/2019 | Kalinichenko | | H04L 9/0825 |
| 2020/0296089 A1* | 9/2020 | Hsiung | | H04L 63/0823 |
| 2021/0049029 A1* | 2/2021 | Kumble | | G06F 9/45558 |

\* cited by examiner

*Primary Examiner* — Eric W Shepperd
(74) *Attorney, Agent, or Firm* — Merchant & Gould P.C.

(57) ABSTRACT

Methods and systems for mapping a sharable resource using a one-time password are disclosed. An identifier included in a set of provided credentials uniquely associates the one-time password with an executable within a computing environment that hosts the sharable resource. When credentials are received in association with a mapping request, it is determined whether a supplied username corresponds to a user authorized to access the sharable resource and whether a representation of a supplied password received in association with the mapping request matches a representation of the one-time password. Validating the mapping request provides access to the sharable resource.

20 Claims, 9 Drawing Sheets

ONE-TIME PASSWORD FOR SECURE SHARE MAPPING

BACKGROUND

One-time passwords are often used in the context of user authentication. For example, one-time passwords may be issued to users in the case of credential resetting. However, use of such passwords in other contexts is less widespread. In particular, use of one-time passwords in the context of secure container sharing may not be acceptable because of existing requirements that may involve a user in creating such one-time passwords, as well as the lack of security of such one-time passwords when those passwords are deployed.

In the context of a hosted environment, a host system may execute using a native execution architecture, and a hosted environment may be emulated or translated for execution in that native execution architecture by hosting software (e.g., virtualization software). While this arrangement is convenient, it means that such hosted environments are typically self-contained because all hosted software must be executed through an emulator or translated pre-execution.

It is desirable to instantiate containers that host arbitrary code for execution. For example, an application or workload containerization software package may be used to execute code from a remote computing system (e.g., a cloud system). However, often such containerized software requires, during execution, access to files owned by the environment that calls or instantiates the containerized software. In typical contexts, this may be provided by instantiating a memory space (e.g., a Docker volume) that can share files between a host system and a containerized hosted system. However, this arrangement is sub-optimal from a security perspective. Rather, it is desirable to allow a container to have access to files owned by the instantiating process (e.g., owned by a hosted environment that instantiates the container). However, this requires that credentials be provided to the container at the time of container creation in a secure manner, so the container can then successfully access shared files or other resources at the hosted system. In this context, one-time passwords might be used, but traditional applications of such passwords require user involvement, as noted above. Accordingly, improvements in use of one-time passwords for secure share mapping are desirable.

SUMMARY

In summary, the present disclosure relates to methods and systems for implementing one-time password use for secure mapping of sharable resources.

In a first aspect, a method of mapping a sharable resource located in a first computing environment for access by a second computing environment is disclosed. The method includes connecting the second computing environment to an input/output communication process, and creating a one-time password and an identifier that uniquely associates the one-time password with executable code within the first computing environment that hosts the sharable resource. The method further includes, after creating the one-time password, communicating resource sharing information to the second computing environment via the input/output communication process, the resource sharing information including the one-time password and a username, and having the identifier embedded therein. The method also includes receiving data indicative of credentials provided in association with a mapping request received from the second computing environment, the credentials including a supplied username and a supplied password. The method includes, upon determining that the supplied username corresponds to a user authorized to access the sharable resource and determining that a representation of the supplied password received in association with the mapping request matches a representation of the one-time password uniquely associated with the executable code, validating the mapping request to provide access to the sharable resource in the first computing environment to the second computing environment.

In a second aspect, a system includes a host computing environment comprising a processor and a memory communicatively connected to the processor. The memory stores instructions including a hosting executable, a hosted execution environment including a sharable resource, and an external execution interface. The instructions are configured to cause the system to: instantiate, from the hosted execution environment, a containerized execution environment separate from the hosted execution environment, the containerized execution environment including containerized executable code; based on a request to map the sharable resource for access by the containerized execution environment, create a one-time password and an identifier that uniquely associates the one-time password with executable code within the hosted execution environment that hosts the sharable resource; after creating the one-time password, communicating resource sharing information to the containerized execution environment, the resource sharing information including the one-time password and a username, and having the index embedded therein; receive data indicative of credentials provided in association with a mapping request received from the containerized execution environment, the credentials including a supplied username and a supplied password; and upon determining that the supplied username corresponds to a user authorized to access the sharable resource and determining that a representation of the supplied password received in association with the mapping request matches a representation of the one-time password uniquely associated with the executable code, validate the mapping request to provide access to the sharable resource in the hosted computing environment to the containerized execution environment.

In a third aspect, a system includes a host computing environment and a hosted computing environment including a sharable resource, the hosted computing environment being executable via a hosting executable on the host computing environment. The system further includes a containerized execution environment external from the hosted computing environment and executable using a different instruction set architecture than the hosted computing environment, and an automatic mapping script executable within the containerized execution environment. The system further includes a support library accessible within the hosted computing environment and configured to generate a one-time password and an index value; and transmit the one-time password and index value to the containerized execution environment via an external service executable. The support library cooperates with a sharing protocol implemented within the hosted computing environment to provide access to the sharable resource to the containerized execution environment in response to execution of the automatic mapping script.

DETAILED DESCRIPTION

As briefly described above, embodiments of the present invention are directed to applications of one-time passwords for secure share mapping. For example, embodiments of the present invention may be used to provide one-time passwords to a secure container, such that the secure container may successfully access files or other resources shared from a hosted environment.

In general, the methods and systems described herein utilize one-time passwords that are granted to external execution environments, but which are also linked to an environment from which a resource is shared. This allows external execution environments to use such one-time passwords to access sharable resources, such as mappable network drives, while also associating the one-time password with the user or environment from which the sharable resource is shared.

The process described herein has a number of advantages relative to existing approaches. For example, in example implementations, unique information may be embedded within a domain name of a user to associate a username of a user in an external environment with an identifier of a one-time password to allow for efficient verification of the one-time password, as well as correlation between the one-time password, the user identification associated with the secure container, and the user identification associated with the sharable resource.

Additionally, in the context of a hosted computing environment that may execute using a different instruction set architecture as compared to a host computing environment and a containerized software environment, the methods and systems described herein allow for use of containerized software that may be written in any convenient language useable on that host instruction set architecture rather than written specifically for the hosted system, while still providing mapped access to a sharable resources within the hosted computing environment.

Figure 1:
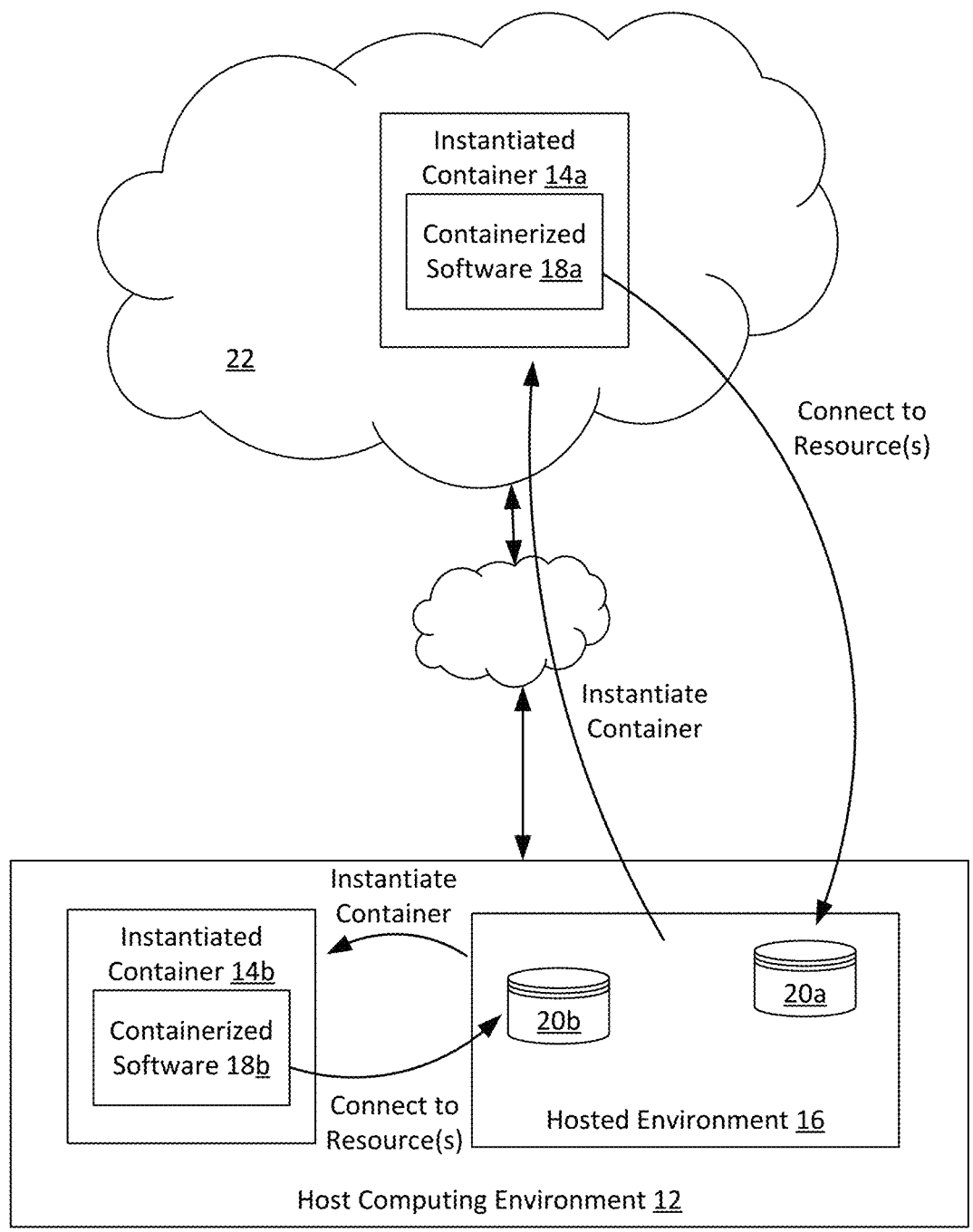
FIG. 1 illustrates an example environment in which aspects of the present disclosure may be implemented.

Referring to FIG. 1, an example environment 10 in which aspects of the present disclosure may be implemented is shown. In the example shown, a computing environment 10 includes a host system 12 as well as external computing resources 14 (shown as external computing resources 14a-b). The host system 12 can, for example, be a commodity computing system including one or more computing devices, such as the computing system described in conjunction with FIGS. 2-4. The host system 12 may, for example, execute utilizing a particular instruction set architecture and operating in system, such as a x86 or ARM-based instruction set architecture and a Windows-based operating system provided by Microsoft corporation of Redmond Wash.

In the example shown, the host system 12 may host one or more hosted computing environments 16. The hosted computing environments 16 may include, for example, a hosted environment that executes utilizing a different instruction set architecture as compared to the host system. For example, in some embodiments, the hosted computing environment 16 may include a Master Control Program ("MCP") based computing environment provided by Unisys Corporation of Blue Bell, Pa. However, other instruction set architectures, or operating systems may be utilized as well.

In the example shown, the external computing resources 14 may include one or more computing systems that are local to the host system 12, or may be remote from the host system 12, e.g., cloud computing resources 22. In such an example, an execution container 14a-b may be instantiated by executing software, such as software being executed within the hosted computing environment 16. In some examples, the execution container may be a Docker container provided by Docker, Inc., which includes a set of operating system level virtualization services usable to containerize software packages for independent execution.

In such an example system, software 18 (seen as containerized software 18a-b, respectively) containerized within the execution container may require access to a sharable resource 20 (seen as resources 20a-b, respectively), such as files or other resources residing within the hosted computing environment. In such examples, the hosted computing environment may allow access to the files or other resources via a sharing mechanism. An example sharing mechanism may include use of a server message block (SMB) protocol, such as the Microsoft SMB Protocol implementation provided by Microsoft Corporation of Redmond, Wash. Other example sharing mechanisms (e.g., Network File System, or "NFS") may be used as well.

To implement sharing between the software 18 containerized within the execution container (or other external computing resources) and the hosted computing environment 16, a predefined set of information will typically be provided to the containerized software 14. For example, in the context of a hosted MCP application instantiating a software container 14 and sharing files or resources using the Microsoft SMB Protocol implementation, the predefined set of information may include a drive letter desired for mapping to the shared resource, a path to the sharable resource 20 within the hosted computing environment 16, a fully qualified username for use in credential validation, and a password for use during credential validation.

As noted above, although the set of information to be provided to the containerized software 18 may be available at the time of the institution of the containerized software, it is not desirable to hard code that information within the container, for security reasons and to provide additional flexibility. For example, in instances where the information or the sharable resource 20 is not available at the time of instantiation of the container 14, hard coding the information is impossible. Still further, it may be desirable to require either user input to confirm access to the sharable resource 20, or allow for automated access to the sharable resource 20 via a batch process.

As further discussed below, a process of securely mapping to shared resources is provided herein which allows access to those shared resources from remote systems, such as containerized software. Although discussed herein in the context of containerized software, it is recognized that the methods and systems described here in for securely mapping to shared resources are not so limited. Rather, the methods and systems described herein represent a process specific mapping request for access to shared resources generally. Accordingly, FIGS. 2-4 below provide further details regarding a particular environment in which the secure share mapping process may take place. FIGS. 5-9 then describe a general method for secure share mapping using a one-time password, as well as a specific method that may be utilized within the context of containerized software accessing resources from a hosted computing environment, which may execute using a different instruction set as compared to the containerized software.

I. Example Hardware Environment

Figure 2:
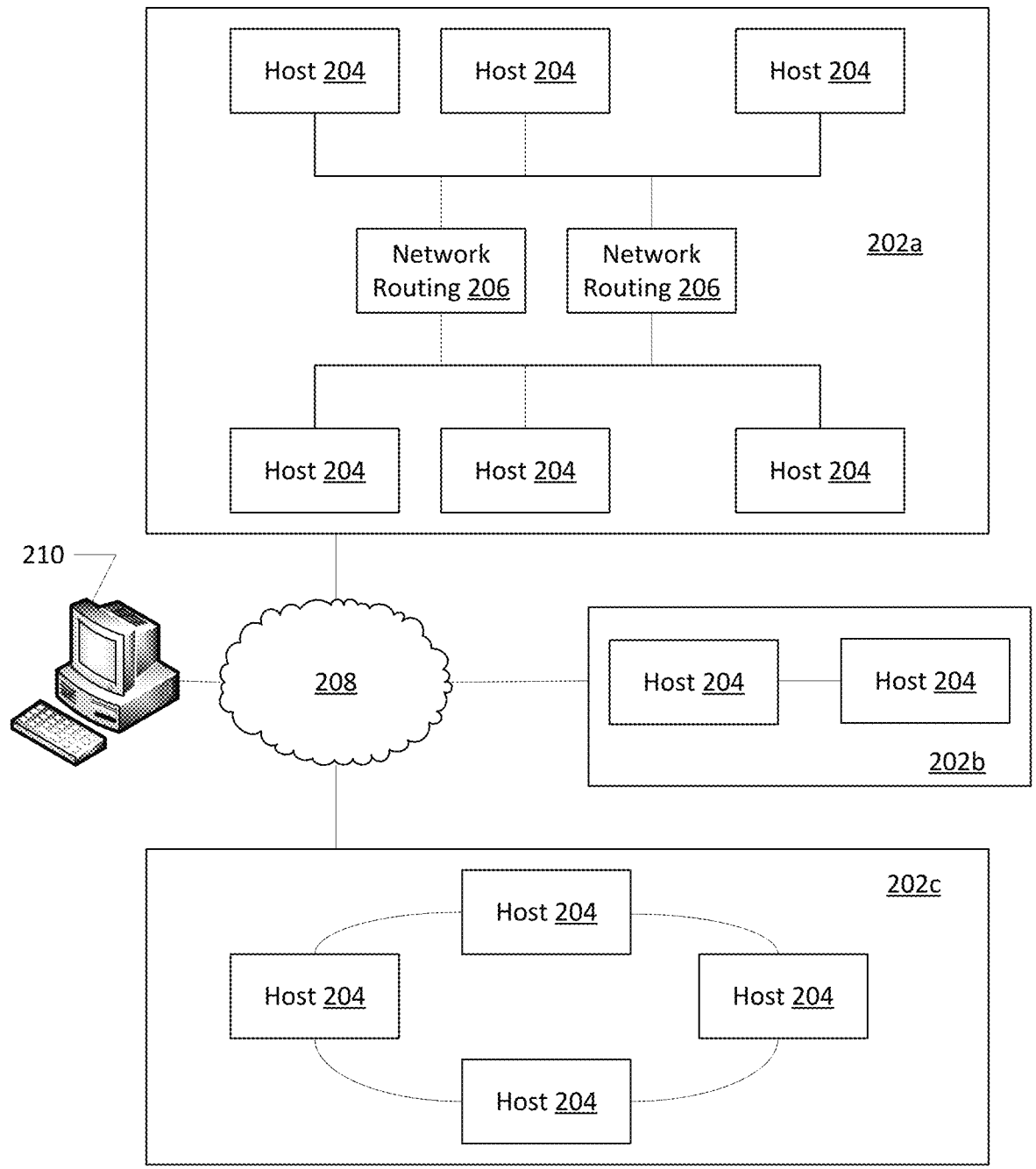
FIG. 2 illustrates a distributed multi-host system in which aspects of the present disclosure can be implemented.
Figure 3:
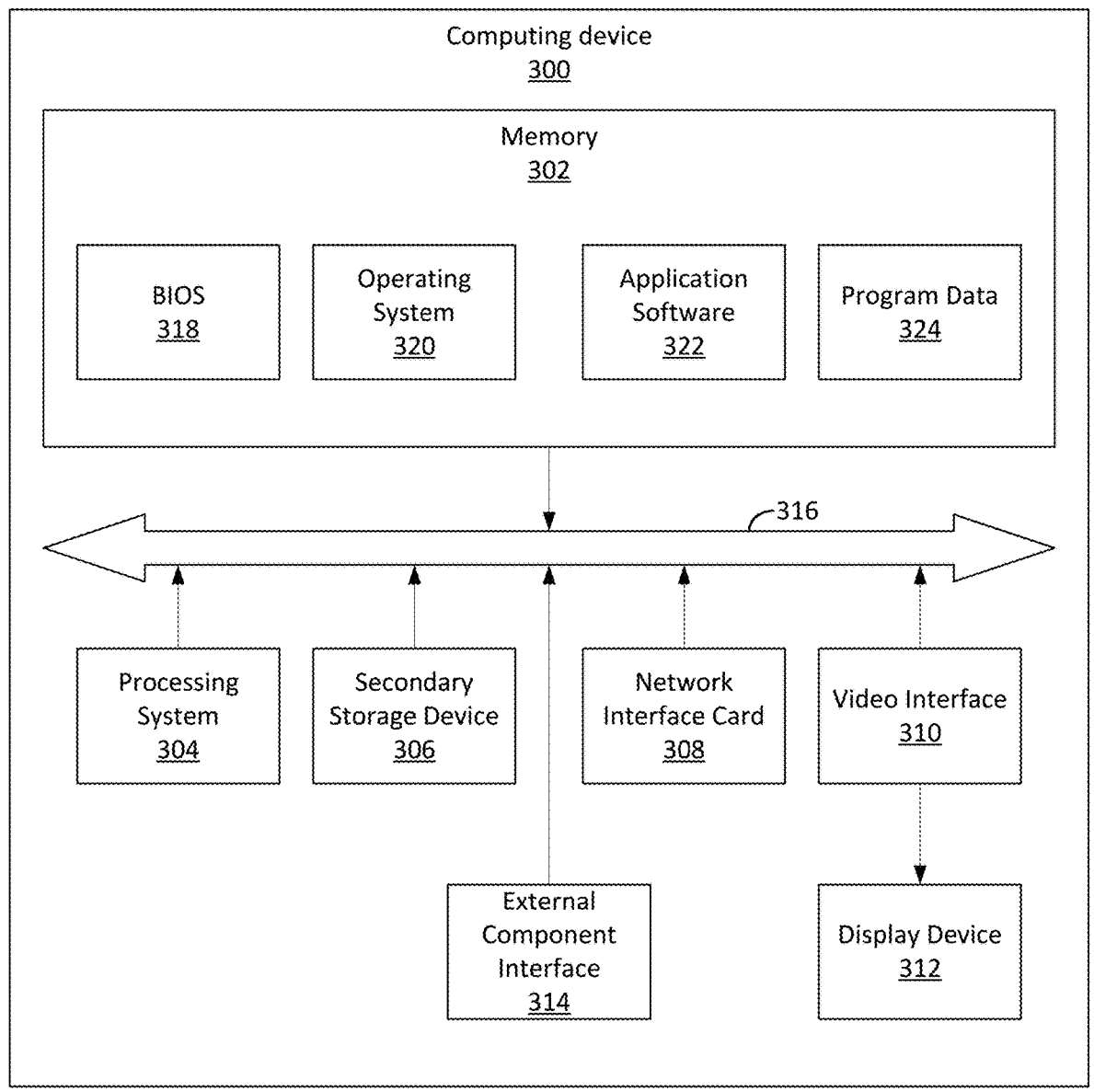
FIG. 3 is a schematic illustration of an example computing system in which aspects of the present disclosure can be implemented.
Figure 4:
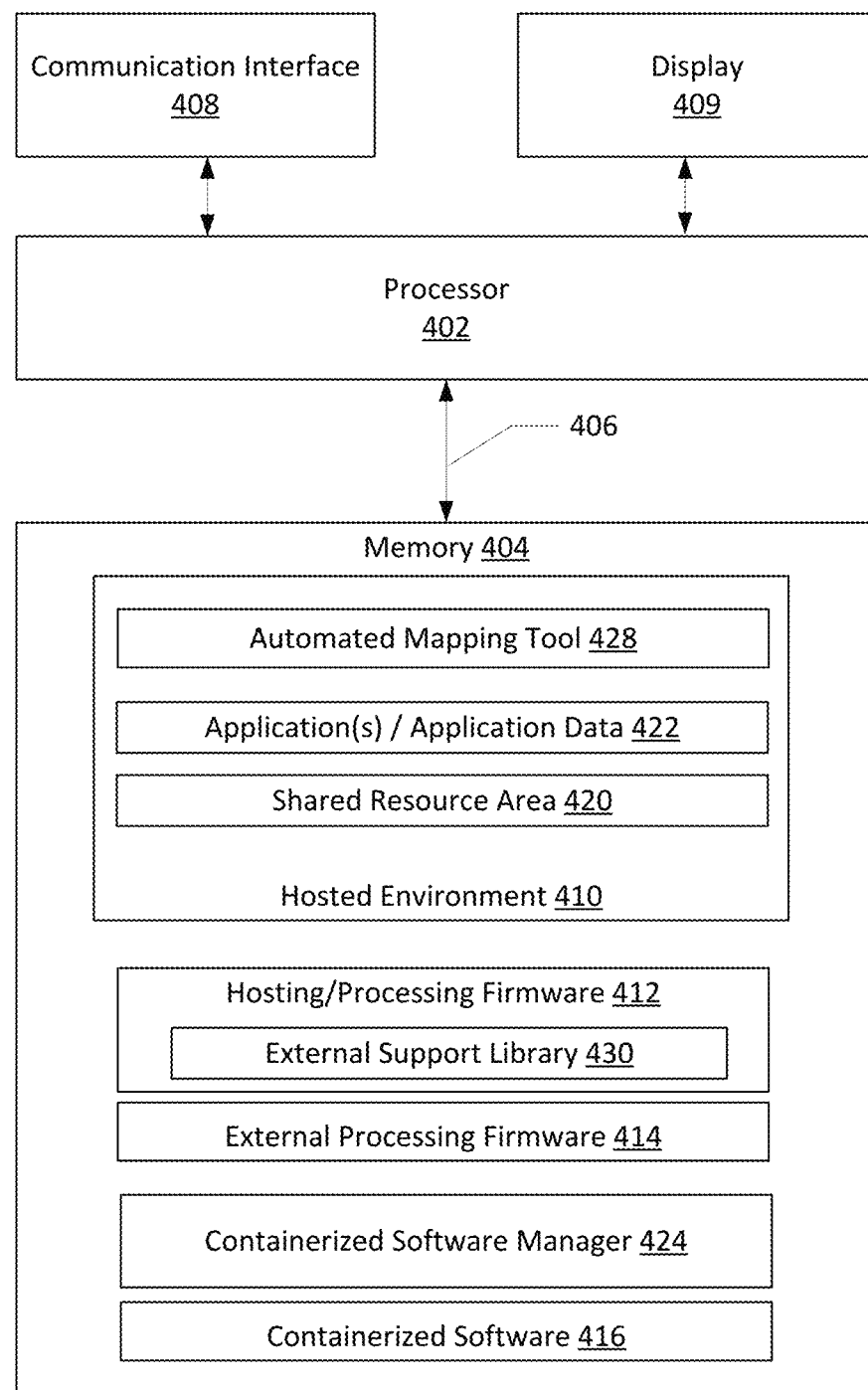
FIG. 4 is a schematic illustration of an example computing system useable as a host computing system for operation of a hosted computing environment useable in the context of the present disclosure.

Referring now to FIGS. 2-4, example hardware environments are disclosed in which aspects of the present disclosure may be implemented. The hardware environments disclose may, for example, represent particular computing systems or computing environments useable within the overall context of the system described above in conjunction with FIG. 1.

Referring now to FIG. 2, a distributed multi-host system 200 is shown in which aspects of the present disclosure can be implemented. The system 200 represents a possible arrangement of computing systems or virtual computing systems useable to implement the environment 10 of FIG. 1. In the embodiment shown, the system 200 is distributed across one or more locations 202, shown as locations 202a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202a-c each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202a includes network routing equipment 206, which routes communication traffic among the various hosts 204, for example in a switched network configuration. Second location 202b illustrates a peer-to-peer arrangement of host systems. Third location 202c illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an Internet Protocol-based ("IP-based") network; in alternative embodiments, other types of interconnect technologies, such as an Infiniband switched fabric communications link, Fibre Channel, PCI Express, Serial ATA, or other interconnect could be used as well.

Among the locations 202a-c, a variety of communication technologies can also be used to provide communicative connections of host systems 204 at different locations. For example, a packet-switched networking arrangement, such as via the Internet 208, could be used. Preferably, the interconnections among locations 202a-c are provided on a high-bandwidth connection, such as a fiber optic communication connection.

In the embodiment shown, the various host systems 204 at locations 202a-c can be accessed by a client computing system 210. The client computing system can be any of a variety of desktop or mobile computing systems, such as a desktop, laptop, tablet, smartphone, or other type of user computing system. In alternative embodiments, the client computing system 210 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 204 within the overall system 200 can be used; for example, different host systems 204 may have different numbers or types of processing cores, and different capacity and type of memory and/or caching subsystems could be implemented in different ones of the host system 204. Furthermore, one or more different types of communicative interconnect technologies might be used in the different locations 202a-c, or within a particular location.

Referring now to FIG. 3, a schematic illustration of an example discrete computing system in which aspects of the present disclosure can be implemented. The computing device 300 can represent, for example, a native computing system operable as a host computing environment 12, or various cloud resources 14. In particular, the computing device 300 represents the physical construct of an example computing system at which an endpoint or server could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an input/output ("I/O") operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as a liquid crystal display (LCD) display panel, a plasma screen display panel, a touch-sensitive display panel, a light emitting diode (LED) screen, a cathode-ray tube display, or a projector. The video interface 310 can communicate with the display unit 312 in various ways, such as via a Universal Serial Bus (USB) connector, a video graphics array (VGA) connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data and application software is described below in connection with FIGS. 4-5.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal.

By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

FIG. 4 is a schematic illustration of an example computing system useable within a computing environment, such as the host computing platform 12 described above in connection with FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3.

The memory 404 can include any of a variety of memory devices, such as using various types of computer-readable or computer storage media, as also discussed above. In the embodiment shown, the memory 404 stores instructions which, when executed, provide a hosted environment 410, hosting firmware 412, external processing firmware 414, and optionally containerized software 416, discussed in further detail below. The computing system 400 can also include a communication interface 408 configured to receive and transmit data, e.g., to provide access to a sharable resource such as a resource hosted by the hosted environment 410. Additionally, a display 409 can be used for viewing a local version of a user interface, e.g., to view executing tasks on the computing system 400 and/or within the hosted environment 410.

In example embodiments, the hosted environment 410 is executable from memory 404 via a processor 402 based on execution of hosting firmware 412. Generally, the hosting firmware 412 translates instructions stored in the hosted environment 410 for execution from an instruction set architecture of the hosted environment 410 to a native instruction set architecture of the host computing environment, i.e., the instruction set architecture of the processor 402. In a particular embodiment, the hosting firmware 412 translates instructions from a hosted MCP environment to a host Windows-based (e.g., x86-based) environment.

In the example shown, the memory 404 includes external processing firmware 414 and optionally, containerized software 416. The external processing firmware 414 is accessible from and called by the hosting firmware 412 for purposes of allowing the hosted environment 410 to interact with external software, e.g., containerized software 416 or other software executing from remote computing systems. In example embodiments, the hosting firmware 412 and external processing firmware 414 are directly executable via the processor 402, for example on separate, dedicated threads of the computing system.

In example embodiments, the hosted environment 410 includes a shared resource area 420 and one or more applications 422. In example embodiments, the shared resource area 420 may correspond to an example of a sharable resource, and may be, for example, a sharable network drive managed by the hosted environment 410 and storing data configured for access, editing, and or use within the hosted environment. However, as noted above, in some instances sharable resources may be desirable to be accessed from external to the hosted environment 410.

In example embodiments, the applications 422 correspond to applications that are executable within the hosted environment 410. For example, the applications 422 may be written in any language, or compiled in an instruction set architecture, which is compatible with execution within the hosted environment 410. Accordingly, such applications 422 may be contrasted with containerized software 416, which may be directly executable within the instruction set architecture of the host computing system 400 but which is incompatible with the hosted environment 410. Nevertheless, both applications 422 and containerized software 416 may desire access to the shared resource area 420 to view, edit, and modify files or data stored therein.

In the example shown, the containerized software manager 424 is included at the host computing platform 12. In general the containerized software manager 424 allows for creation and configuration of containerized software systems that may in turn connect to the hosted environment 410. The containerized software manager 424 may, for example, correspond to a Docker manager tool that may be callable from the applications 422 by communication via the external processing firmware 414. In such an arrangement, the containerized software manager 424 may be called from the applications 422 within the hosted environment 410 to instantiate containerized software 416, either local to or remotely from the host platform 12. In example embodiments, the containerized software 416 may be directly executable on an instruction set architecture of the host platform 12, while the applications 422 are not directly executable on the host platform 12, but instead require translation via the hosting firmware 412.

Also as shown, the hosted environment 410 includes an automated mapping tool 428. The automated mapping tool 428 initiates a mapping process from within the hosted environment to cause external computing resources (e.g., the containerized software 416) to be able to map to and access the shared resource area 420. The automated mapping tool 428 coordinates execution of the object applications 422 with initialization of the containerized software 416, for example by adding one or more scripts for execution within the container upon instantiation of the container. An example of execution of such a tool is described in further detail below.

In the example shown, the hosting firmware 412 includes an external support library 430. The external support library 430 can include, for example, various processes that are used by the hosting firmware 412 to interact with the external processing firmware 414. For example, in the context provided herein, the external support library 430 may include functions used for generating access credentials to sharable resources within the hosted environment 410. For example, this can include generation and storage of a one-time password as well as an identifier useable to index to storage of such a one-time password (or hash thereof) for validation of the external systems when such systems seek access to sharable resources managed by the hosting firmware 412 and hosted environment 410.

In particular examples, the hosting firmware 412 and hosted environment 410 may implement a sharing protocol useable to share the shared resource area 420. A variety of sharing protocols may be used. In one example embodiment a server message block (SMB) protocol may be utilized.

Although the system 400 reflects a particular configuration of computing resources, it is recognized that the present disclosure is not so limited. In particular, access to sharable resources may be provided from any of a variety of types of computing environments, rather than solely a hosted, non-native environment. The methods described below may provide secure access to such sharable resources in other types of environments II. Methods of Providing Secure Share Mapping Using One-Time Passwords Referring now to FIGS. 5-9, various embodiments are discussed for providing secure share mapping using one-time passwords. The embodiments discussed herein may utilize any of the systems described above with respect to FIGS. 1-4, or in some cases, a more specific hardware environment such as shown in connection with FIG. 8. Overall, the methods described herein provide a number of advantages over existing processes for mapping shares (e.g., shared drives) across two devices, and in particular across two devices using different instruction set architectures. In one example, because the sharing environment does not require a full domain path for a user name, additional information can be embedded within the domain name that can be used for secure connection among devices and environments, and in particular between a remote environment seeking access to a share mapping and the password used to establish that connection.

Figure 5:
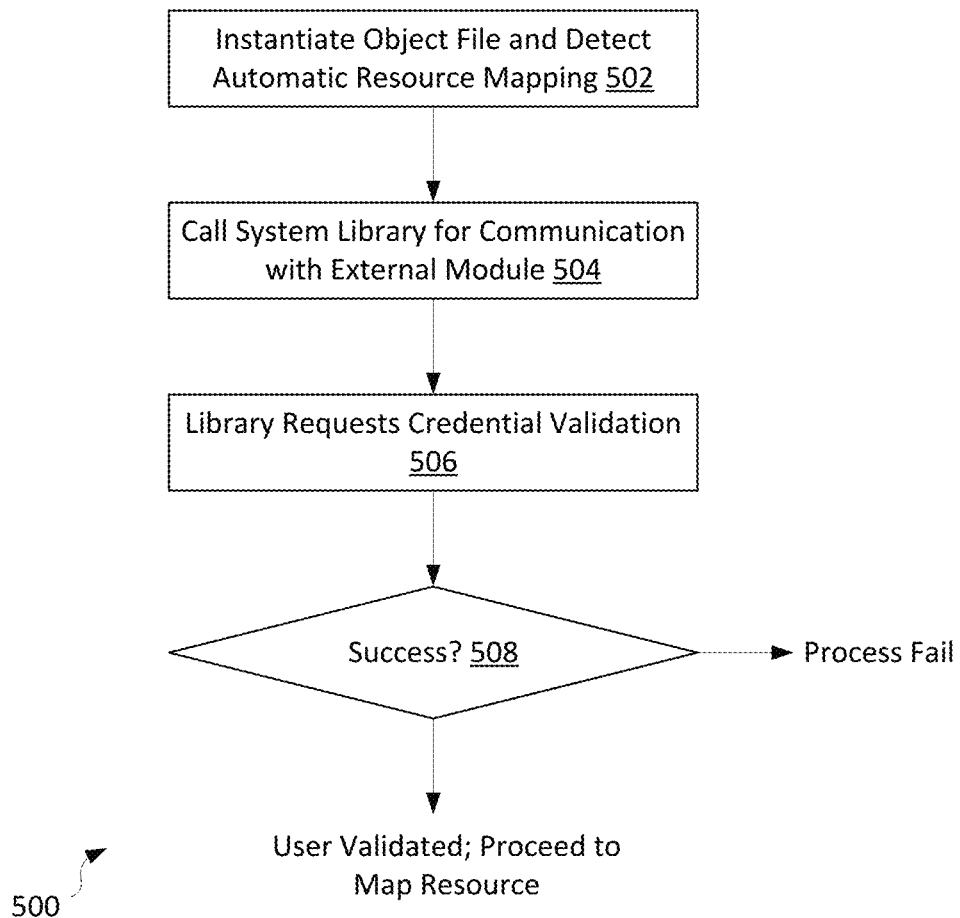
FIG. 5 is a flowchart of a method of instantiating containerized software from a computing environment for purposes of mapping a sharable resource of the computing environment for access by the containerized software.
Figure 6:
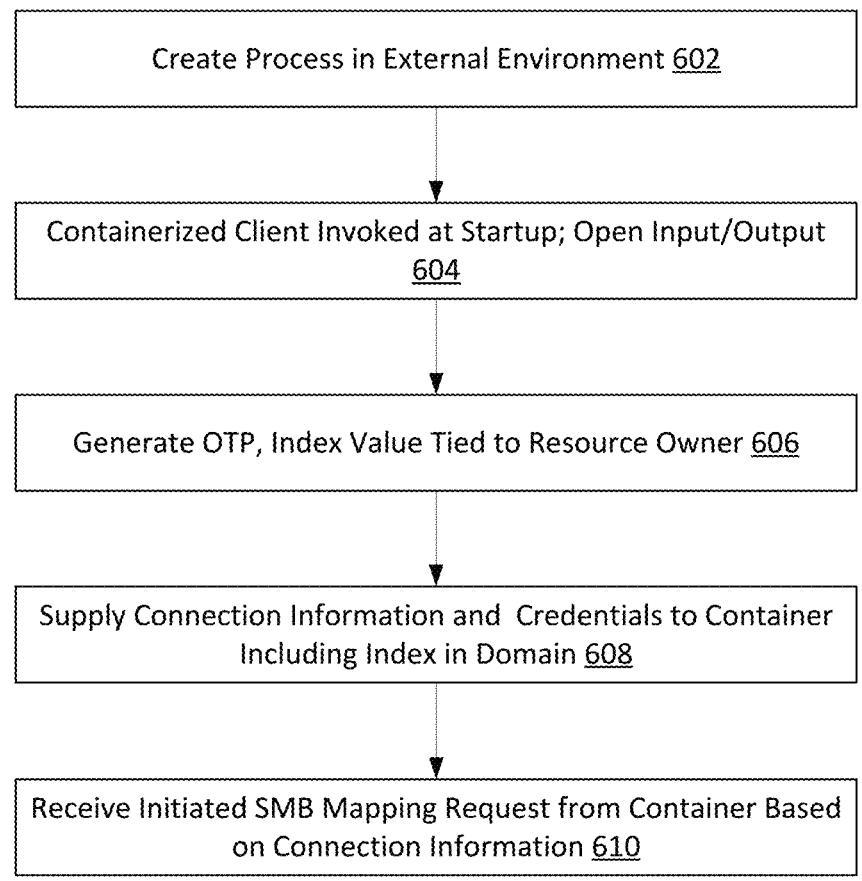
FIG. 6 is a flowchart of a method of providing one-time use credentials to the containerized software instantiated according to the method of FIG. 5, according to an example embodiment.
Figure 7:
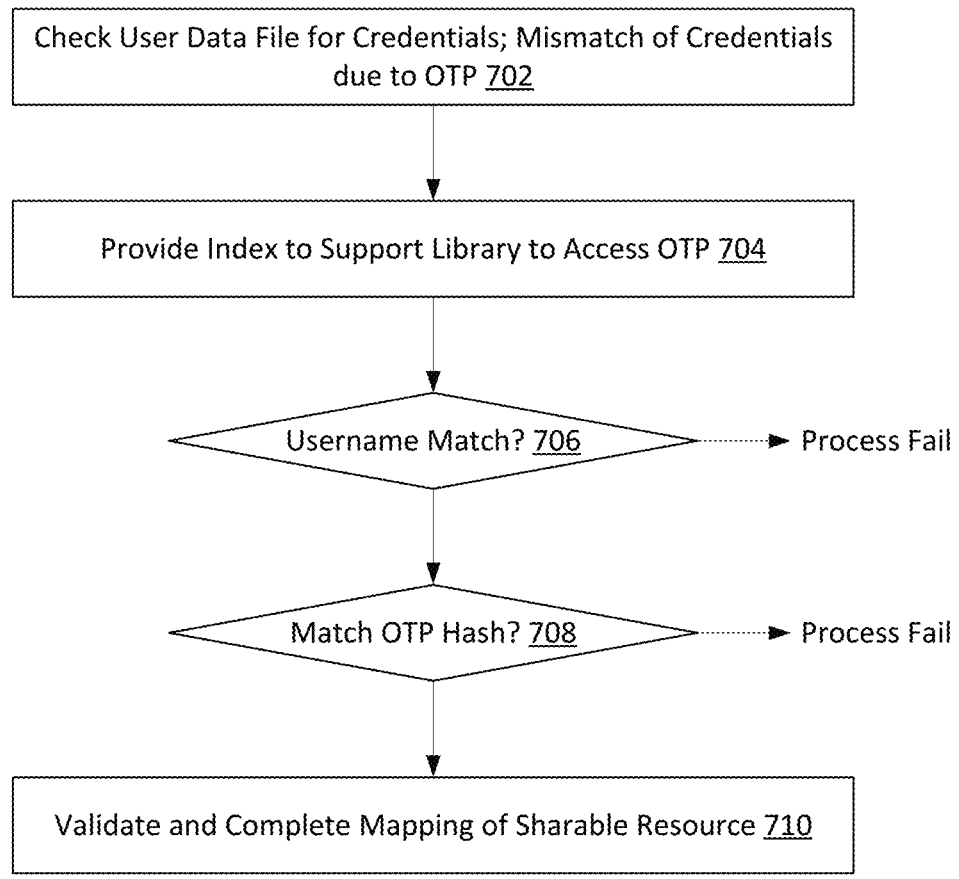
FIG. 7 is a flowchart of validating one-time use credentials for purposes of granting access to a sharable resource, according to an example embodiment.

Referring to FIGS. 5-7 methods of instantiating a second computing environment from a first computing environment for purposes of mapping a sharable resource from the first computing environment to the second computing environment are provided. The methods described herein are described in the context of a containerized software environment been established from a source environment; however, as noted above the methods and systems ascribed herein are not so limited.

Referring to FIG. 5, a flowchart of a method 500 of instantiating a separate processing environment from a computing environment for purposes of mapping a sharable resource of the computing environment for access by that separate processing environment. The method 500 may be performed from a hosted environment in combination with hosting firmware, such as described above in FIG. 4. In examples contemplated herein, the separate processing environment may be a containerized software process that is instantiated from the separate processing environment.

In some cases, the initializing processing environment may be a hosted computing environment executing according to a first instruction set architecture, but hosted on a system that executes a second instruction set architecture as noted above. The containerized process may execute using a separate instruction set architecture, different from the first instruction set architecture. For example, the containerized process may execute according to the native instruction set architecture of the host system. In some examples, the hosted computing environment may correspond to an MCP computing environment provided by Unisys Corporation of Blue Bell, Pa. The host computing environment may correspond to a Windows computing environment provided by Microsoft Corporation of Redmond Wash. Other types of instruction set architectures and operating environments may be utilized as well.

In the example shown, the method 500 is executed at a time a containerized environment is to be instantiated for execution of an object file. At such time, the instantiating environment (e.g., the hosted computing environment) may detect that automatic resource mapping is to be performed regarding the containerized environment relative to a sharable resource available within the hosted computing environment (step 502). The sharable resource may be, for example, a shared drive, file, or shared memory space. In example embodiments the sharing is provided using a server message block (SMB) sharing protocol.

Upon detection of automatic resource mapping, the method 500 further includes calling a support library for communication with the external computing environment (step 504). The support library may be included, for example, within an executable (e.g., hosting firmware) usable to translate code within the hosted computing environment for execution on the host system. The support library may be any library usable to allow for interactions between the hosting firmware and external executing code.

In the embodiment shown, the method 500 further includes requesting, from the support library, credential validation from a user (step 506). The credential validation generally corresponds to validating, within the external computing environment, the identity of the user (e.g., as a valid user). Upon determining in operation 508 that the user is a valid user, a method 500 completes, allowing process flow to continue to create one-time use credentials for the external computing environment as described below in conjunction with FIGS. 6-7.

FIG. 6 is a flowchart of a method 600 of providing one-time use credentials to the containerized software instantiated according to the method of FIG. 5, according to an example embodiment. In the example shown, the method 600 includes creating a process in the external computing environment (step 602) using the validated credentials. This process is generally considered a client, which in turn instantiates and connects to the external computing environment (e.g., the containerized environment) within which it is executing. The process may connect, for example, using a standardized interface, e.g., stdin, stdout, stderr communication channels (step 604). The process is invoked, and a process identifier (PID) is retained within the software used to instantiate the external computing environment and process executing therein (e.g., external processing firmware 414).

In the example shown, the method 600 further includes generating a one-time password and an identifier (e.g., a unique index value) that corresponds to the software instance within the hosted computing environment that is initiating the automatic mapping request (step 606). The identifier allows for a unique association between the software instance in the hosted computing environment and the process that is to be included within the external computing environment which will access a sharable resource within the hosted computing environment. Accordingly, use of the one-time password grants access to the sharable resource for the process within the external computing environment, while the identifier ensures a linkage to the software instance that manages to sharable resource. When the identifier is implemented as an index into a table of such one-time passwords, still further advantages regarding quick access of a corresponding one-time password are achieved.

In the example shown, the method 600 also includes supplying the connection information and credentials to the process in the external computing environment (step 608). The connection information and credentials can include, for example, the one-time password, a drive letter to be used for mapping the sharable resource, a path to the sharable resource, and a generated, fully qualified username. The username can include, for example, a domain name and username separated by a separator character, e.g., a backslash ("\"). However, within the username, the portion that would typically be the domain name may be used for other purposes. This is because, in example embodiments, the hosted computing environment does not require use of domain information for user validation. Accordingly, in example embodiments, the domain name may include the identifier that is associated with the one-time password.

At this point, the external computing environment and process executing therein has the credentials necessary to initiate a mapping request that it may send to the hosted computing environment. The hosted computing environment will receive the initiated mapping request from the external process/container, which includes connection information including the fully qualified username and one-time password (or hash thereof) (step 610). In some examples, at the time the external process is instantiated, it includes instructions (e.g., a script) that is configured to read a particular initial set of information from stdin; in such an arrangement, the received information can correspond to the username and one-time password, as well as drive and path information, and can be used to initiate the mapping request.

FIG. 7 is a flowchart of a method 700 for validating one-time use credentials for purposes of granting access to a sharable resource, according to an example embodiment. The method 700 may be performed, for example, upon receipt of a mapping request such as in step 610 of FIG. 6. The method 700 may accordingly correspond to credential verification as part of a name mapping validation process implemented using any known mapping protocol, such as the server message block protocol mentioned above.

In the example shown, the method 700 includes checking known user credentials managed within a hosted execution environment to validate the user credentials included within the mapping request (step 702). In some examples (such as discussed below in conjunction with FIGS. 8-9), the known user credentials are stored in a user data file. However, because the user data file generally includes user names and passwords of known users within the hosted execution environment, although the user may be known and may have an associated entry in the user data file, validation of the user will not be successful because the supplied password, i.e., the one-time password, does not match the password maintained in the user data file. That is, the password stored in the user data file corresponds to the password of that user for direct access to computing resources within the hosted execution environment.

Accordingly, following the failure to validate the user within the user data file, the identifier (e.g., index) that was received as part of the fully qualified username may be used, by passing the identifier to the support library (step 704). The support library may then return the one-time password (or, in some examples, a hash of the one-time password) for comparison to the password (or hash) that is received as part of the credentials. This can include, in cases where the identifier is an index value, performing a lookup in a table of one-time passwords and indices, to obtain a one-time password that has been associated with the particular resource. Following validation of the user name (at operation 706) and one-time password (at operation 708), the mapping request is granted step 710), providing access to the sharable resource.

Of course, if either the username or one-time password is determined to mismatch (at operations 706, 708), the process will fail, resulting in failure to map the sharable resource to the external environment.

Figure 8:
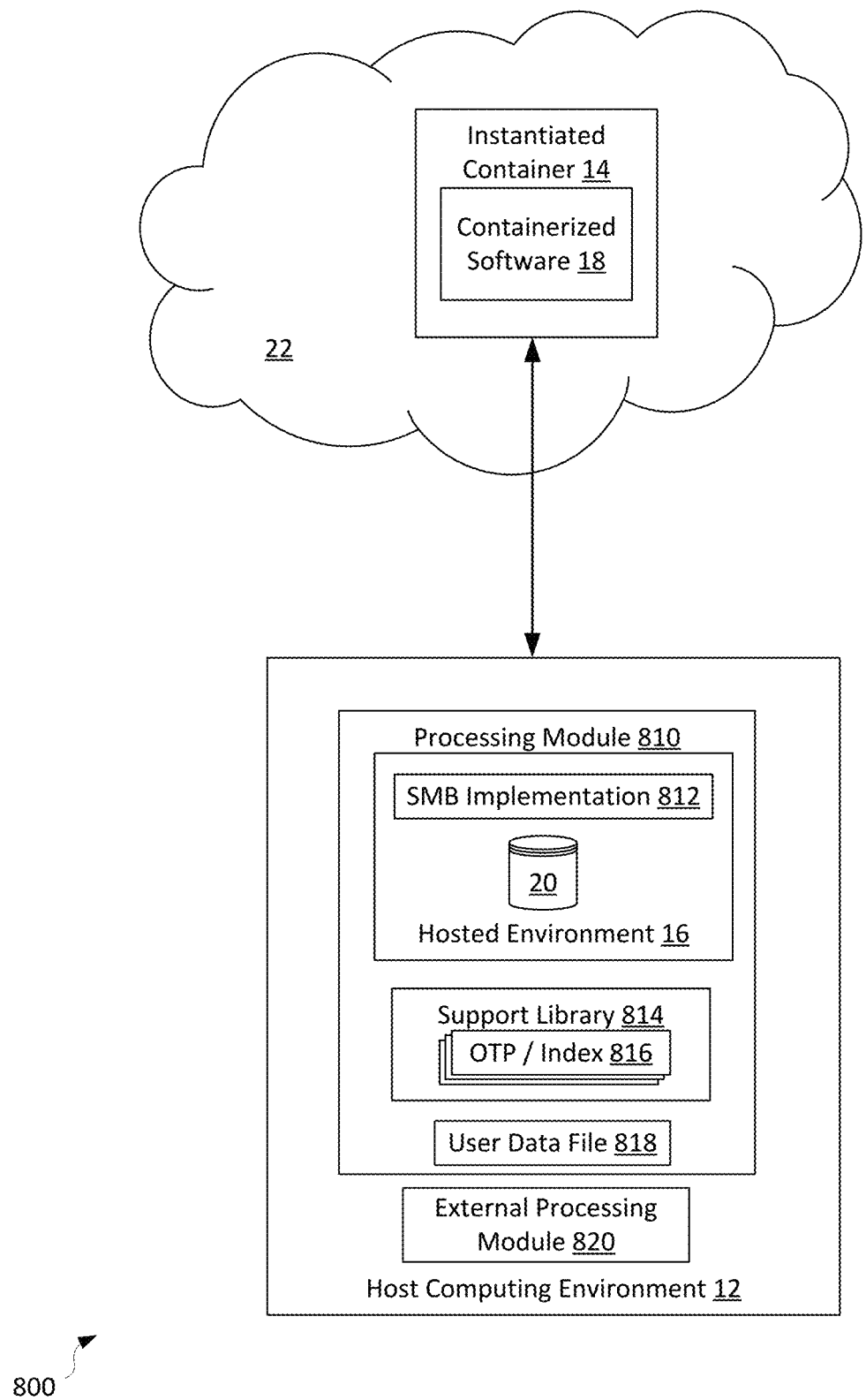
FIG. 8 is a schematic illustration of an example environment in which a one-time password may be used to automatically map a sharable resource of a hosted computing environment for access from containerized software.
Figure 9:
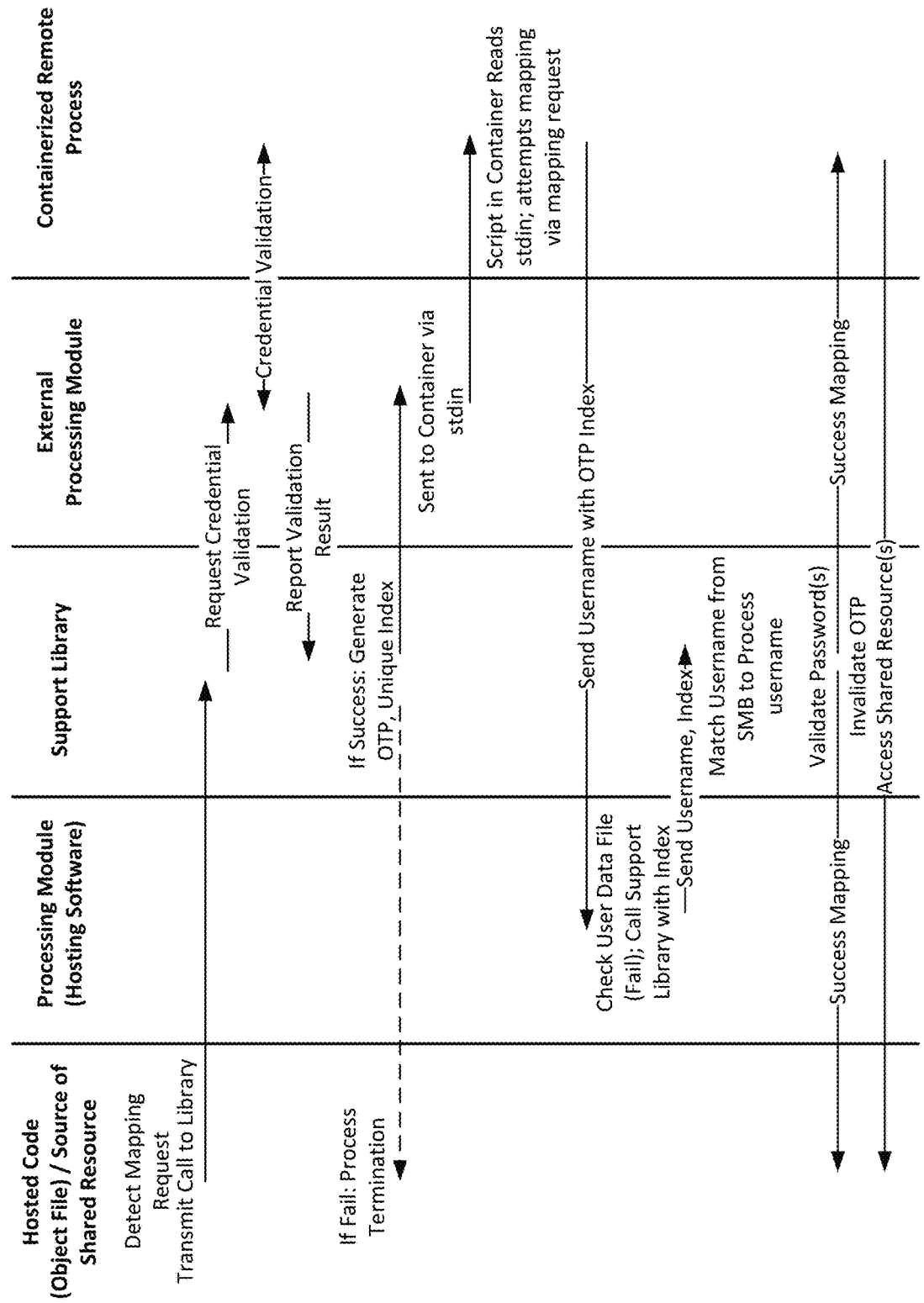
FIG. 9 illustrates an overall process flow for mapping a sharable resource from a hosted computing environment to a containerized application in the context of the computer architecture of FIG. 8.

Referring now to FIGS. 8-9, the general process described in FIGS. 5-7 is described in conjunction with a particular environment in which a hosted execution environment instantiates a containerized process executed using a different instruction set architecture as compared to the hosted execution environment. FIG. 8 provides a schematic illustration of the example environment, while FIG. 9 illustrates an overall process flow for mapping a sharable resource within that environment.

In the example environment 800 of FIG. 8, the host computing environment 12 hosts the hosted computing environment 16 as described above in conjunction with FIG. 1. Additionally, the hosted computing environment 16 hosts a sharable resource 20, such as a mappable network drive or other collections of files and/or folders that might be made accessible to external computing environments. Still further, an instantiated container 14 may host containerized software 18 which may desire access to the sharable resource 20.

In the example shown, the hosted environment 16 is hosted within a processing module 810, which corresponds to a hosting executable capable of translating an instruction set architecture of the hosted computing environment 16 to a different instruction set architecture of the host computing environment 12. In the example embodiment, the hosted environment further includes an SMB implementation 812, which corresponds to an implementation of the server message block (SMB) sharing protocol through which particular directory paths may be shared as a mapped drive exposed to an external computing device. In this embodiment, the external computing environment can correspond to the containerized software 18 that is located remotely from the host computing environment 12, and provides the mapping functionality for exposing the sharable resource 20 to the containerized software 18.

In the example embodiment, the processing module 810 includes a support library 814 and manages a user data file 818. The support library 814 provides services to the processing module 810 for communication with an external processing module 820. One example service can include management of the one-time passwords and index values 816 associated with sharable resources 20 and corresponding container against software 18. The support library 814 also manages interactions between the processing module in FIG. 10 and external processing module 820 which may directly interact with the containerized software 18. The user data file 818 manages a list of users and passwords, as well as other account information, for users authorized to access the hosted environment 16. In accordance with the methods and systems described herein, the user data file 818 will be checked first for a given user. If a provided username and password does not match a username and password in the user data file 818, in some instances the username may be inspected to determine if an index is present. If so, the index may be used to access a specific entry in a collection of one-time passwords stored in the support library 814 for comparison to a supplied password. Accordingly, a given user may either provide his or her username and password, or may be associated with a one-time password if the user is associated with an instantiation of containerized software 18.

Referring now to FIG. 9, an overall process flow 900 for mapping a sharable resource from a hosted computing environment to a containerized application in the context of the computer architecture of FIG. 8 is shown. In general, the process flow begins when the hosted environment determines that an automatic mapping to a sharable resource is requested. The software executing within the hosted environment makes a call into the support library 814, which is responsible for communicating with the external processing module 820, a firmware component responsible for interfacing with processes external to the hosted computing environment 16.

In the process flow 900 as shown, the support library 814 transfers a request to the external processing module 820, requesting that the external processing module 820 perform credential validation in the external environment (e.g., the instantiated container 14) via a sequence of commands, and the external processing module 820 indicates success or failure of the credentials. The credentials that are used have been specified in advance and are for the sole purpose of process instantiation in the external environment. If the credentials failed, no further processing is possible and the mapping fails. If the credentials are valid then this step is complete and the sequence continues.

In the example process flow 900 as shown, the support library 814 instructs the external processing module 820 to create a process in the external environment (e.g., within the instantiated container 14) using the validated credentials. This process to be invoked (e.g., the containerized software 18) is a client, which in turn instantiates and connects to the container with stdin, stdout, and stderr communication channels. The containerized software is invoked and its process ID (PID) is retained within the external processing module 820.

In the example process flow 900 shown, the support library 814 then generates and retains a unique one-time password as well as a unique index value that corresponds to the instance of the object file initiating the automatic mapping request. This provides correlation between the domain name and the one-time password that the firmware will supply to the container. That is, the fully qualified username supplied for the automatic mapping is a concatenation of the domain name, a separator character (backslash), and the user name from the hosted environment. The domain name, in that context, can include the index value.

The support library 814 then provides the generated username to be used for the mapping, the drive letter to be used for mapping, the path to the share, and the one-time password to the external processing module 820. The external processing module 820 writes the username, the one-time password, the drive, and the path, each terminated with a carriage return and linefeed characters, to stdin.

In the example described herein, a script runs inside the container 14 as the first entity to read from stdin, and with the information supplied by the external processing module 820, attempts to map the sharable resource 20 for use by the containerized software 22. The SMB implementation 812 in the hosted environment 16 receives the mapping request and supplies the credentials it received in the mapping request to the hosted environment 16. The domain name has, as noted above, been overloaded with unique information, such as the index value, which the hosted environment 12 uses in a different way than would be typical in an SMB implementation. Specifically, the hosted environment looks in the user data file 818 to validate the username and password as per a usual validation process for a SMB share. However, the credentials are flagged as not valid. This is because the unique one-time password was used, and the hash of the one-time password does not match the hash of the password stored in the user data file 818.

In the example shown, the hosted environment 16 calls the support library 814, providing the unique index which was part of the modified domain name which in turn was part of the username supplied from the instantiated container 14 (e.g., from the script installed therein). The domain name is used by the support library 814 to interrogate its data structures to ensure that the user name supplied by the hosted computing environment 16 (which it had received from the SMB implementation 812) in fact matches identically to the user that is running the program that has the automatic mapping option set. If it does not match, the mapping to the shares by the container is denied. If it does match, the supplied password and the one-time password which was dynamically generated are validated via generated hashes. If the hashes are identical, the mapping succeeds, the entry associated with the index is invalidated to prevent additional use, and the containerized software 18 will have access to the files in the sharable resource 20.

Referring to FIGS. 1-9 overall, it is noted that there are a number of advantages over existing systems reflected in the process described herein. For example, embedding of the identifier (e.g., index) within the domain name of the user provides us a way of customizing the credentials provided to the hosted environment, and also provided to the script and container, such that a correlation between the container and one-time password can be established. The embedded information in the domain name directly correlates the user and one-time password to the initiating process, and allows for quick processing of credential validation in the event one-time passwords are used in connection with automated mapping requests (e.g., where a large number of such mapping requests may occur concurrently).

Furthermore, by making that unique information an index, the processing of the credential validation is optimized, which provides particular advantages in automated mapping scenarios, since there may be a very large number of mapping request occurring concurrently.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of mapping a sharable resource located in a first computing environment for access by a second computing environment, the method comprising:
   connecting the second computing environment to an input/output communication process;
   creating a one-time password and an identifier that uniquely associates the one-time password with executable code within the first computing environment that hosts the sharable resource;
   after creating the one-time password, communicating resource sharing information to the second computing environment via the input/output communication process, the resource sharing information including the one-time password and a username, and having the identifier embedded therein;
   receiving data indicative of credentials provided in association with a mapping request received from the second computing environment, the credentials including a supplied username and a supplied password; and
   upon determining that the supplied username corresponds to a user authorized to access the sharable resource and determining that a representation of the supplied password received in association with the mapping request matches a representation of the one-time password uniquely associated with the executable code, validating the mapping request to provide access to the sharable resource in the first computing environment to the second computing environment.

2. The method of claim 1, further comprising, upon validating the mapping request to provide access to the sharable resource, invalidating the one-time password.

3. The method of claim 1, wherein the first computing environment comprises a hosted computing environment executing within a host computing environment having a different instruction set architecture as compared to the hosted computing environment, the hosted computing environment being executable within the host computing environment using a translation application executable within the host computing environment.

4. The method of claim 3, wherein the second computing environment comprises a containerized computing environment instantiated from the first computing environment.

5. The method of claim 4, wherein the second computing environment has a different instruction set architecture as compared to the hosted computing environment.

6. The method of claim 1, further comprising initiating credential validation of the second computing environment from a service called by executable code within the first computing environment, the executable code managing the sharable resource.

7. The method of claim 6, wherein creating the one-time password occurs upon completion of credential validation.

8. The method of claim 1, wherein connecting the second computing environment to the input/output communication process is performed in response to creating a process within the second computing environment.

9. The method of claim 1, wherein the resource sharing information further includes a fully qualified domain name and a drive letter.

10. The method of claim 1, wherein determining that the supplied password matches the one-time password comprises comparing a hash of the supplied password to a hash of the one-time password.

11. The method of claim 1, wherein the mapping request comprises a request to map a server message block (SMB) share.

12. The method of claim 1, further comprising, prior to determining that the supplied password matches the one-time password, determining that the supplied password does not match a password associated with a user having the supplied username in a user data file managed within the first computing environment.

13. A system comprising:
a host computing environment comprising:
  a processor;
  a memory communicatively connected to the processor and storing instructions including a hosting executable, a hosted execution environment including a sharable resource, and an external execution interface, the instructions configured to:
  instantiate, from the hosted execution environment, a containerized execution environment separate from the hosted execution environment, the containerized execution environment including containerized executable code;
  based on a request to map the sharable resource for access by the containerized execution environment, create a one-time password and an identifier that uniquely associates the one-time password with executable code within the hosted execution environment that hosts the sharable resource;
  after creating the one-time password, communicate resource sharing information to the containerized execution environment, the resource sharing information including the one-time password and a username, and having the identifier embedded therein;
  receive data indicative of credentials provided in association with a mapping request received from the containerized execution environment, the credentials including a supplied username and a supplied password; and
  upon determining that the supplied username corresponds to a user authorized to access the sharable resource and determining that a representation of the supplied password received in association with the mapping request matches a representation of the one-time password uniquely associated with the executable code, validate the mapping request to provide access to the sharable resource in the hosted computing environment to the containerized execution environment.

14. The system of claim 13, wherein:
the hosted execution environment executes code according to a first instruction set architecture by translation of the code to a second instruction set architecture performed by the hosting executable, and
the containerized executable code comprises code executable according to a second instruction set architecture different from the first instruction set architecture.

15. The system of claim 13, wherein the sharable resource comprises a sharable drive accessible via a mapping established using a server message block (SMB) protocol.

16. The system of claim 13, wherein communicating the resource sharing information to the containerized execution environment comprises communicating the resource sharing information from a support library within the hosted execution environment to the external execution interface and communicating the resource sharing information from the external execution interface to the containerized execution environment via a standard input/output communication process to which the containerized execution environment is connected.

17. The system of claim 16, wherein a representation of the one-time password and the identifier are retained within the support library at least until a successful mapping request is received from the containerized execution environment.

18. The system of claim 17, wherein the identifier comprises an index, and wherein the instructions are further configured to use the index received within the supplied username to perform a lookup of the representation of the one-time password maintained within the support library, wherein the representation of the one-time password comprises a hash of the one-time password.

19. The system of claim 13, wherein the one-time password is a different password as compared to a first password associated with the user in a user data file maintained within the hosted execution environment.

20. A system comprising:
a host computing environment comprising one or more computing systems, each of the one or more computing systems including a processor and a memory;
a hosted computing environment including a sharable resource, the hosted computing environment being executable via a hosting executable on the host computing environment;

a containerized execution environment external from the hosted computing environment and executable via the host computing environment using a different instruction set architecture than the hosted computing environment;
an automatic mapping script executable within the containerized execution environment;
a support library accessible within the hosted computing environment and configured to:
  generate a one-time password and an index value; and
  transmit the one-time password and index value to the containerized execution environment via an external service executable;
wherein the support library cooperates with a sharing protocol implemented within the hosted computing environment to provide access to the sharable resource to the containerized execution environment in response to execution of the automatic mapping script.

* * * * *